(12) United States Patent
Seufert

(10) Patent No.: US 12,268,314 B2
(45) Date of Patent: Apr. 8, 2025

(54) FLOOR STAND FOR CLAMPING AND PUTTING UP PANEL-SHAPED OBJECTS

(71) Applicant: Heinz Seufert, Triboltingen (CH)

(72) Inventor: Heinz Seufert, Triboltingen (CH)

( * ) Notice: Subject to any disclaimer, the term of this patent is extended or adjusted under 35 U.S.C. 154(b) by 0 days.

(21) Appl. No.: 18/394,015

(22) Filed: Dec. 22, 2023

(65) Prior Publication Data

US 2024/0225314 A1  Jul. 11, 2024

(30) Foreign Application Priority Data

Jan. 9, 2023 (EP) .................................. 23150807
Dec. 18, 2023 (EP) .................................. 23217531

(51) Int. Cl.
*A47F 7/00* (2006.01)
*A47F 5/10* (2006.01)

(52) U.S. Cl.
CPC .............. *A47F 7/0042* (2013.01); *A47F 5/10* (2013.01)

(58) Field of Classification Search
CPC ...... A47B 97/04; A47B 97/08; F16M 11/041; F16M 11/046; A47F 5/10; A47F 7/0042
See application file for complete search history.

(56) References Cited

U.S. PATENT DOCUMENTS

| | | | | |
|---|---|---|---|---|
| 2,032,872 A * | 3/1936 | Friedrichs | .............. | A47B 97/04 248/449 |
| 2,912,203 A * | 11/1959 | Townsend | .............. | A47B 97/04 248/448 |
| 3,095,834 A * | 7/1963 | Killen | .............. | A47B 97/04 108/1 |
| 3,231,230 A * | 1/1966 | Mueller | .............. | F16M 11/28 248/476 |
| 3,370,821 A * | 2/1968 | Mingis | .............. | A47B 97/04 248/463 |
| 3,738,606 A * | 6/1973 | Millen | .............. | A47B 97/08 248/185.1 |
| 4,690,363 A * | 9/1987 | Koves | .............. | A47B 97/08 248/163.1 |
| 4,856,749 A | 8/1989 | Habermann | | |
| 5,467,958 A * | 11/1995 | Selvaggio | .............. | A47B 97/04 248/452 |
| 5,494,251 A * | 2/1996 | Katz | .............. | A47B 97/04 248/456 |
| 5,950,979 A * | 9/1999 | Mira | .............. | A47B 97/08 248/460 |
| 6,601,805 B1 * | 8/2003 | Kapp | .............. | A47B 97/08 248/464 |
| 7,195,213 B2 * | 3/2007 | Weatherly | .............. | A47B 81/061 248/125.1 |
| 7,530,543 B1 * | 5/2009 | Kremzar | .............. | A47B 97/02 248/188.7 |
| 8,864,098 B2 * | 10/2014 | Bottazzi | .............. | E04F 21/1805 248/176.1 |

(Continued)

FOREIGN PATENT DOCUMENTS

FR 2329232 B3 7/1979
KR 101221974 B1 * 1/2013 ............. A47B 97/08

*Primary Examiner* — Patrick D Hawn
(74) *Attorney, Agent, or Firm* — Volpe Koenig

(57) ABSTRACT

A floor stand for clamping a panel-shaped object thereto and for thereby putting up the panel-shaped object on a floor. The use of the floor stand for clamping a panel-shaped object thereto for putting up the panel-shaped object on a floor is also provided.

17 Claims, 8 Drawing Sheets

(56) References Cited

U.S. PATENT DOCUMENTS

| | | | | |
|---|---|---|---|---|
| 8,870,148 B2* | 10/2014 | Hickman | ............... | A47B 97/04 |
| | | | | 248/447.2 |
| 10,028,585 B2* | 7/2018 | Lee | ......................... | A47B 97/04 |
| 10,123,619 B2* | 11/2018 | Kennedy | ................. | A47B 97/04 |
| 11,490,731 B2* | 11/2022 | Norman | ................. | F16M 11/10 |
| 2006/0192071 A1* | 8/2006 | Choi | ...................... | A47B 97/08 |
| | | | | 248/460 |
| 2007/0075209 A1* | 4/2007 | Kapp | .................... | F16M 11/34 |
| | | | | 248/460 |
| 2020/0085193 A1* | 3/2020 | Robinson-Barrett | .. | A47B 97/04 |
| 2021/0393033 A1* | 12/2021 | Morita | .................... | B44D 3/00 |
| 2024/0225314 A1* | 7/2024 | Seufert | ................. | A47F 7/0042 |

* cited by examiner

FLOOR STAND FOR CLAMPING AND PUTTING UP PANEL-SHAPED OBJECTS

CROSS-REFERENCE TO RELATED APPLICATIONS

This application claims priority to European Patent Application No. EP23150807.8, filed Jan. 9, 2023, and to European Patent Application No. EP23217531.5, filed Dec. 18, 2023, both of which are incorporated herein by reference as if fully set forth.

TECHNICAL FIELD

The invention relates to a floor stand for clamping a panel-shaped object thereto and for putting up the panel-shaped object on a floor. The invention further relates to the use of the floor stand for clamping a panel-shaped object thereto and putting up the panel-shaped object on a floor.

BACKGROUND

Since ancient times artists or owners of artwork are interested in letting the artwork meet an audience. To bring the artwork to the audience, or vice versa, many different concepts have been developed. With respect to artwork, which is in the form of a panel-shaped object, e.g. any kind of painting with or without a frame, a display panel, a panel-shaped display screen, a panel-shaped sculpture, etc., nowadays, the concept of presenting an art show is extremely popular. Common artwork exhibitions display panel-shaped objects by attaching the objects to a wall. The audience, who meets the artwork is thereby invited to view the object, as it is fixed to the wall, from a position in front of the wall. For the exhibitor this means, that he has to provide a wall for each panel-shaped object, to attach each panel-shaped object to a wall and to detach each panel-shaped object from the wall and restore the wall after the exhibition has ended.

There is a need for providing a solution, which enables to let the audience meet a panel-shaped artwork-object in a way that the wall has no effect on the perception of the artwork-object.

Furthermore, there is a need for providing a solution, which enables an exhibitor or owner of artwork to display or exhibit a panel-shaped artwork-object with less effort.

SUMMARY

It is therefore object of the present invention to provide a device which meets the above needs.

This is solved by providing a floor stand having one or more of the features disclosed herein. Advantageous embodiments of the floor stand are described below and int eh claims. The use of a floor stand having one or more of the features is also provided.

The invention relates to a floor stand for clamping and putting up a panel-shaped object.

According to the invention the floor stand has a foot for placing the floor stand on a floor surface, a beam which is connectable to the foot and, if connected to the foot, can be put up on a floor such that the beam extends in a direction transversely to the floor surface, and a clamping device.

The clamping device comprises a lower clamp with an object mounting surface and a lower projection transverse to the object mounting surface, and an upper clamp with an object contacting surface and an upper projection transverse to the object contacting surface, the upper clamp being connectable with the beam, wherein the panel-shaped object is mountable onto the object mounting surface, contactable with the object contacting surface and clampable to the beam by the clamping device, whereby the panel-shaped object can be put up on the floor.

Furthermore, the floor stand has a fixing device for fixing the clamping device to the beam.

The foot comprises an outrigger which is configured to stabilize the floor stand such that, with the panel-shaped object clamped to the beam by the clamping device, the panel-shaped object is installable free-standing on the floor surface, in particular free-standing from a wall and a ceiling.

The beam is a telescopic beam and includes a base part and a telescopic part, wherein the telescopic part is telescopically moveable away from and towards the base part and lockable to the base part in different positions relative to the base part by the fixing device.

The upper clamp comprises a mounting which, if the foot is connected to the telescopic beam, is configured to be slipped onto the telescopic part in a direction parallel to the telescopic beam and towards the foot, and to be fixed by the fixing device to the telescopic part.

The weight and shape of the foot is configured to stabilize the floor stand such that the panel-shaped object being clamped to the beam is installable free-standing on the floor. Therefore, the foot can be made of steel and can comprise one or several outriggers, for example three or four, for stabilizing the floor stand. The outrigger can be a plate, for example a rectangular or square shaped plate. The foot can comprise a levelling device for aligning the floor stand, for example for aligning the floor stand horizontally. If the foot comprises outriggers the levelling device can be arranged at an end portion of an outrigger. Then the levelling device can be for example an inclined surface of an outrigger, which—when the foot is placed on the floor surface—provides a gap between the floor surface and the end portion. The gap then is able to receive a wedge for levelling and/or further stabilizing the floor stand. Furthermore, the foot can comprise a connecting portion with screw holes, wherein the foot can be connected to the beam by screwing the connecting portion with its screw holes to the beam. The foot can comprise two separate parts, wherein the separate parts are designed such, that they are stackable to save space, which can be relevant during packing the floor stand for transportation. The foot can comprise a sleeve-shaped connecting portion, wherein the beam is insertable into the sleeve-shaped connecting portion. The sleeve-shaped connecting portion can comprise screw holes for screwing the sleeve shaped connecting portion to the beam.

The telescopic beam, in particular the base part and the telescopic part, can be made, for example, of wood, metal or a composite material. If the telescopic beam is made of a composite material the composite material can have a structurally reinforcing phase. The telescopic beam can have a substantially rectangular cross section. The telescopic beam can be a flat beam with narrow side faces connecting a wider front and a wider back face of the beam.

For example, if the telescopic beam is connected to the foot, in particular if the base part is connected to the foot, and put up on the floor such that the telescopic beam extends in a direction transversely to the floor surface, the telescopic part can be moved out of the base part, can be moved back into the base part and can be locked to the base part in different positions. Thereby the telescopic beam can be adjusted to a desired length and thereby to a desired height from the floor.

The object mounting surface of the lower clamp is a surface on which a panel-shaped object is mountable, wherein mountable means placeable. With other words the object mounting surface is designed such that a panel-shaped object can simply be placed onto it.

The lower projection can be provided by a lower element made of wood, metal or a lower element, which is polymer based, in particular polymethylmethacrylate based. The lower projection can be provided by a lower plate element, which adjoins the object mounting surface in a way that a surface of the lower plate element is oriented transversely to the object mounting surface, wherein that surface of the lower plate element forms the lower projection. The lower plate element can be transparent. The lower plate element can be designed as a cover element, which can be detachably fixed to the lower clamp. The lower plate element, also if designed as cover element, can be screwed to the lower clamp.

The object contacting surface of the upper clamp is a surface, which can be brought into contact with a panel-shaped object. For example, a panel-shaped object can be brought into contact with the object contacting surface by placing the upper clamp onto the panel-shaped object.

The upper projection can be provided by an upper element made of wood, metal or an element, which is polymer based, in particular polymethylmethacrylate based. The upper projection can be provided by an upper plate element, which adjoins the object contacting surface, in a way that a surface of the upper plate element is oriented transversely to the object contacting surface, wherein that surface of the upper plate element forms the upper projection. The upper plate element can be transparent. The upper plate element can be designed as a cover element, which can be detachably fixed to the upper clamp. The upper plate element, also if designed as cover element, can be screwed to the upper clamp.

The fixing device is configured for and comprises elements for fixing the upper clamp and the lower clamp to the beam and each at a specified position relative to the beam and for fixing the upper clamp and the lower clamp in a clamped position in which the panel-shaped object is clamped to the beam. The fixing device can further be configured to lock the telescopic part and the base part relative to each other at different positions.

A floor stand according to the invention can be used to clamp a panel-shaped object thereto and to put up the panel-shaped object free-standing, in particular free-standing from a wall and a ceiling, on a floor. Such a floor stand can be used, for example, as follows:

In a first step the foot is connected to the telescopic beam followed by putting up the foot on a floor surface such that the telescopic beam stands vertically on the floor surface.

In a next step the height above the floor at which the upper edge of the panel-shaped object is to be clamped is determined. Then the telescopic beam is extended to the determined height by moving the telescopic part out of the base part and locking the base part and the telescopic part to each other. The lower clamp is fixed to the telescopic beam at the position where the lower edge of the panel-shaped object is to be clamped. That position is determined by the height of the panel-shaped object.

In a next step the panel-shaped object is placed/mounted onto the object mounting surface and leaned against the telescopic beam. Thereby the lower projection can inhibit the slipping away of the panel-shaped object.

In an optional next step, the lower edge of the panel-shaped object can be clamped with the lower clamp to the telescopic beam.

In a next step the upper clamp with its mounting is slipped onto the telescopic part in a direction parallel to the telescopic beam and towards the foot and the object contacting surface of the upper clamp is contacted to the panel-shaped object by placing the upper clamp on the panel-shaped object, wherein the upper projection can inhibit the slipping away of the panel-shaped object.

In a next step the panel-shaped object is clamped to the telescopic beam and the upper clamp is fixed to the telescopic part by fixing the mounting to the telescopic part aiding the fixing device.

The panel-shaped object is now clamped to the floor stand and thereby put up free-standing on the floor.

By using such a floor stand in the above described way an exhibitor or owner of artwork can display the artwork without the need of a wall and/or ceiling and without having a wall and/or ceiling influencing the perception of the artwork. Furthermore, such a floor stand allows for clamping and putting up panel-shaped objects in a way, without having the floor stand, in particular the beam of the floor stand, protruding the upper edge of the panel-shaped object in a vertical direction. Furthermore, such a floor stand allows for clamping and putting up different panel-shaped objects having different sizes, for example different lengths, heights, thicknesses, frame dimensions etc.

Such a floor stand enables an exhibitor or owner of artwork to put up a panel-shaped object without tools.

Furthermore, such a floor stand enables putting up a panel-shaped object by a single person.

To clamp and put up an elongated panel-shaped object, several such floor stands can be used one besides another one. Consequently, such a floor stand can further be used for putting up more than one, for example two or three, panel-shaped objects besides each other.

According to an embodiment of the floor stand the upper clamp comprises a stop, which is configured to stop the telescopic part from slipping through the mounting and to a position at which it protrudes the upper clamp. Thereby, in a state in which the upper clamp with its mounting is slipped onto the telescopic part, the telescopic part does not protrude the upper clamp in a direction parallel to the telescopic beam.

The stop has the effect that the telescopic beam or the telescopic part does not protrude the upper edge of the clamped panel-shaped object. This improves the perception of the free-standing panel-shaped object.

According to an embodiment of the floor stand the base part is a tubular profile and the telescopic part is a tubular profile and the telescopic part has a smaller cross section than the base part.

According to an embodiment of the floor stand the mounting is a tubular profile. The mounting can have a cross section which is similar or identical to the cross section of the base part.

According to an embodiment of the floor stand the mounting has a larger cross section than the telescopic part and is configured to receive the telescopic part inside the cross section.

According to an embodiment of the floor stand the stop is a bolt arranged on the mounting and, if the mounting is slipped onto the telescopic part, extends transversely to the telescopic beam. This means that the bolt extends transversely to the longitudinal direction of the telescopic beam.

According to an embodiment of the floor stand the lower clamp has a sliding element and a shifting element, wherein the shifting element comprises the object mounting surface and the lower projection, and the sliding element is a unit and comprises a first and two further feedthroughs. The first feedthrough is arranged between the two further feedthroughs, and the beam is passable through the first feedthrough. If the beam is passed through the first feedthrough, the sliding element is slidable along the beam and fixable thereto by the fixing device, and the shifting element is shiftable in the two further feedthroughs in a direction transversely to the beam, and is fixable by the fixing device so that by shifting the lower projection towards the beam and by fixing the shifting element, the panel-shaped object is clampable by the lower projection to the beam, whereby the panel-shaped object can be put up on the floor.

The sliding element is a unit, which means, that the sliding element forms a unit. The sliding element can be made of sheet-like material, which is formed and joined together to form a unit. The sheet-like material can be formed by bending the sheet-like material. The sheet-like material can be sheet metal. The unit can be formed by joining bended sheet-like material, wherein joining can be achieved by riveting or welding bended sheet-like material together. Therefore, the sliding element can comprise bended sheet metal parts, which are riveted or welded together and thereby form a unit. Using sheet-like material comes to the advantage, that it can be efficiently cut to the desired dimensions and formed and joined by traditional processes.

The sliding element can be made by an additive manufacturing process.

The sliding element can be made from a block, for example from a metal block.

The first and the two further feedthroughs are designed such that they penetrate the sliding element and thereby the unit. The first feedthrough can be arranged in a centric position of the sliding element. The first and the two further feedthroughs can be through holes in the sliding element.

The first feedthrough can have a cross section, which corresponds to the cross section of the beam in a way that between the beam's surface, along which the sliding element is slidable, and the surface of the first feedthrough a minimum distance is provided, which ensures the slidability of the sliding element, that the sliding element is slidable along the beam in a rotationally fixed manner and that the sliding element is fixable to the beam in a rotationally fixed manner.

The shifting element can have a cross section, which corresponds to the cross section of the two further feedthroughs in a way that between the shifting elements surface, which is shiftable in the two further feedthroughs and the surface of the two further feedthroughs a minimum distance is provided, which ensures the shiftability of the shifting element and that the shifting element is held transversely to the beam while a panel-shaped object is mounted on the object mounting surface. The shifting element can be made of wood, metal or can be polymer based.

The lower plate element can be designed as a cover element, which can be detachably fixed to the shifting element. The lower plate element, also if designed as cover element, can be screwed to the shifting element.

The fixing device is designed and comprises elements for fixing at least the sliding element of the lower clamp at a specified position relative to the beam and the shifting element of the lower clamp at a specified position relative to the sliding element.

The floor stand having a lower clamp with a sliding element and a shifting element can be used for clamping a panel-shaped object to the beam, for example, as follows:

After having connected the foot to the telescopic beam and after having put up the foot on a floor surface such that the telescopic beam stands vertically on the floor surface, the shifting element of the lower clamp is shifted in the two further feedthroughs to a position at which the shifting element provides the object mounting surface, which is needed for placing/mounting the lower edge of panel-shaped object onto it. The surface, which is needed for placing/mounting the panel-shaped object onto it depends on the depth/thickness of lower edge of the panel-shaped object. The shifting element is fixed at that position by the fixing device.

In a next step the beam is passed through the first feedthrough of the sliding element which carries the shifting element and slid along the beam down to the position at which the lower edge of the panel-shaped object is to be clamped to the beam.

In a next step the panel-shaped object is placed/mounted onto the object mounting surface and leaned against the telescopic beam. Thereby the lower projection can inhibit the slipping away of the panel-shaped object.

In an optional next step, the shifting element is unfixed and by shifting the shifting element towards the beam the lower projection is shifted towards the beam until the lower projection contacts the lower edge of the panel-shaped object and clamps the panel-shaped object to the beam.

According to an embodiment of the floor stand the sliding element comprises a surface, which corresponds to the lower projection, so that by shifting the lower projection the panel-shaped object is clampable between the lower projection and the surface, which corresponds to the lower projection.

Thereby a panel-shaped object can be clamped at a horizontal distance to the beam. Because the surface, which corresponds to the lower projection, is part of the lower clamp it is ensured, that irrespective of the size of the panel-shaped object or the vertical position at which the panel-shaped object is clamped, clamping is limited to an edge region.

The surface, which corresponds to the lower projection relates to a surface, which has a similar orientation to the lower projection. The surface, which corresponds to the lower projection can be substantially parallel to the lower projection. The surface which corresponds to the lower projection can be the surface of a plate element, which is arranged on the sliding element in such a way that the surface corresponds to the lower projection. The plate element can be elastically deflectable towards and away from the beam.

Clampable between the lower projection and the surface, which corresponds to the lower projection relates to a state, where the panel-shaped object is clamped between the lower projection and the surface, which corresponds to the lower projection, by the panel-shaped object contacting both the lower projection and the surface, which corresponds to the lower projection.

According to an embodiment of the floor stand, if the beam is passed through the first feedthrough, the surface, which corresponds to the lower projection projects beyond the sliding element in the longitudinal direction of the beam, in particular by one or more centimetres, in particular wherein the surface which corresponds to the lower projection comprises a surface region, which is angled towards the beam.

The surface region, which is angled towards the beam provides a smooth edge, eliminating the risk of scratching a panel-shaped object or injuring a person using the floor stand during clamping and putting up the panel-shaped object.

According to an embodiment of the floor stand the fixing device comprises a locking pin and a through hole in the beam going through the base part and through the telescopic part, wherein the locking pin is pushable into the through hole and positionable in the through hole in such a way that, if the locking pin is positioned in the through hole, the sliding element is placeable on the locking pin and is thereby fixable to the beam and the telescopic part is locked to the base part. The beam can have several such through holes along the beam.

The locking pin can be made of wood, metal or can be polymer based.

According to an embodiment of the floor stand the fixing device comprises a locking pin displaceably held on the sliding element and a through hole in the beam going through the base part and through the telescopic part, wherein the locking pin is displaceable into the through hole in such a way that, if the locking pin is displaced into the through hole, it fixes the sliding element to the beam and the telescopic part is locked to the base part.

According to an embodiment of the floor stand the fixing device comprises a fixing screw or bolt, wherein, if the upper clamp with its mounting is slipped onto the telescopic part, the mounting is fixable to the telescopic part with the fixing screw or bolt.

According to an embodiment of the floor stand the fixing device comprises a fixing screw on the sliding element, wherein the sliding element is braceable against the beam by tightening the fixing screw and is thereby fixable to the beam.

According to an embodiment of the floor stand the fixing device comprises a fixing screw on the sliding element, wherein, if the shifting element is passed through the two further feedthroughs, the shifting element is braceable against the sliding element by tightening the fixing screw and is thereby fixable to the sliding element.

According to an embodiment of the floor stand the first feedthrough and the two further feedthroughs have a substantially rectangular cross section.

According to an embodiment of the floor stand the shifting element is U-shaped, comprises two legs and a web connecting the two legs, wherein one of the two legs extends through one of the two further feedthroughs, the other of the two legs extends through the other of the two further feedthroughs and the web has the lower projection, in particular wherein one of the two legs comprises a pin, which projects beyond the surface of the one of the two legs in such a way that the shifting element is captively connected to the sliding element.

A part of the surface of the two legs can form the object mounting surface.

According to an embodiment of the floor stand the shifting element comprises two guide webs and two connecting webs connecting the two guide webs to form a substantially rectangular frame, one of the two guide webs extending through one of the two further feedthroughs, the other of the two guide webs extending through the other of the two further feedthroughs, one of the two connecting webs connecting the two guide webs on a first side of the sliding element, and the other of the two connecting webs connecting the two guide webs on a second side of the sliding element, which is opposite the first side.

A part of the surface of the two guide webs can form the object mounting surface.

According to an embodiment of the floor stand the upper clamp comprises a further sliding element and a further shifting element, wherein the further shifting element has the object contacting surface and the upper projection.

The further sliding element and the further shifting element are designed according to the sliding element and shifting element of the lower clamp and comprise their features as according to the invention and can also comprise their features as according to any of the embodiments of the lower clamp.

Thereby, the upper part of a panel-shaped object can be clamped to the beam by shifting the upper projection towards the beam and by fixing the upper shifting element.

The invention also relates to the use of an inventive floor stand for clamping a panel-shaped object thereto and thereby putting up the panel-shaped object on a floor.

According to a further aspect of the floor stand the beam of the above floor stand is a beam, which is not a telescopic beam.

Then according to the further aspect, the floor stand has a foot for placing the floor stand on a floor surface, a beam which is connectable to the foot and, if connected to the foot, can be put up on a floor such that the beam extends in a direction transversely to the floor surface, and a clamping device.

The clamping device comprises a lower clamp with an object mounting surface and a lower projection transverse to the object mounting surface, and an upper clamp with an object contacting surface and an upper projection transverse to the object contacting surface, the upper clamp being connectable with the beam, wherein the panel-shaped object is mountable onto the object mounting surface, contactable with the object contacting surface and clampable to the beam by the clamping device, whereby the panel-shaped object can be put up on the floor.

Furthermore, the floor stand has a fixing device, the lower clamp has a sliding element and a shifting element, wherein the shifting element comprises the object mounting surface and the lower projection, and the sliding element is a unit and comprises a first and two further feedthroughs.

The first feedthrough is arranged between the two further feedthroughs, and the beam is passable through the first feedthrough.

If the beam is passed through the first feedthrough, the sliding element is slidable along the beam and fixable thereto by the fixing device, and the shifting element is shiftable in the two further feedthroughs in a direction transversely to the beam, and is fixable by the fixing device so that by shifting the lower projection towards the beam and by fixing the shifting element, the panel-shaped object is clampable by the lower projection to the beam, whereby the panel-shaped object can be put up on the floor.

The foot can comprise several outriggers, for example three or four, for stabilizing the floor stand. The foot can comprise a levelling device for aligning the floor stand, for example for aligning the floor stand horizontally. If the foot comprises outriggers the levelling device can be arranged at an end portion of an outrigger. Furthermore, the foot can comprise a connecting portion with screw holes, wherein the foot can be connected to the beam by screwing the connecting portion with its screw holes to the beam. The foot can comprise two separate parts, wherein the separate parts are designed such, that they are stackable to save space, which can be relevant during packing the floor stand for transportation. The foot can comprise a sleeve-shaped connecting portion, wherein the beam is insertable into the sleeve-shaped connecting portion. The sleeve-shaped connecting portion can comprise screw holes for screwing the sleeve shaped connecting portion to the beam.

The beam can be made, for example, of wood, metal or a composite material. If the beam is made of a composite material the composite material can have a structurally reinforcing phase. If the beam is made of metal, it can be, for example, a hollow profile. The hollow profile can be an aluminium profile. The beam can have a substantially rectangular cross section. The beam can be a flat beam with narrow side faces connecting a wider front and a wider back face of the beam.

The object mounting surface of the lower clamp is a surface on which a panel-shaped object is mountable, wherein mountable means placeable. With other words the object mounting surface is designed such that a panel-shaped object can simply be placed onto it.

The lower projection can be provided by a lower element made of wood, metal or a lower element, which is polymer based, in particular polymethylmethacrylate based. The lower projection can be provided by a lower plate element, which adjoins the object mounting surface in a way that a surface of the lower plate element is oriented transversely to the object mounting surface, wherein that surface of the lower plate element forms the lower projection. The lower plate element can be transparent.

The lower plate element can be designed as a cover element, which can be detachably fixed to the shifting element. The lower plate element, also if designed as cover element, can be screwed to the shifting element.

The object contacting surface of the upper clamp is a surface, which can be brought into contact with a panel-shaped object. For example, a panel-shaped object can be brought into contact with the object contacting surface by placing the upper clamp onto the panel-shaped object.

The upper projection can be provided by an upper element made of wood, metal or an element, which is polymer based, in particular polymethylmethacrylate based. The upper projection can be provided by an upper plate element, which adjoins the object contacting surface, in a way that a surface of the upper plate element is oriented transversely to the object contacting surface, wherein that surface of the upper plate element forms the upper projection. The upper plate element can be transparent. The upper plate element can be designed as a cover element, which can be detachably fixed to the upper clamp. The upper plate element, also if designed as cover element, can be screwed to the upper clamp.

The upper clamp can have a beam-feedthrough, through which the beam is passable such that by passing the beam through the beam-feedthrough the upper clamp is connectable with the beam.

The fixing device is designed and comprises elements for fixing at least the sliding element of the lower clamp at a specified position relative to the beam and the shifting element of the lower clamp at a specified position relative to the sliding element.

The sliding element is a unit, which means, that the sliding element forms a unit. The sliding element can be made of sheet-like material, which is formed and joined together to form a unit. The sheet-like material can be formed by bending the sheet-like material. The sheet-like material can be sheet metal. The unit can be formed by joining bended sheet-like material, wherein joining can be achieved by riveting or welding bended sheet-like material together. Therefore, the sliding element can comprise bended sheet metal parts, which are riveted or welded together and thereby form a unit. Using sheet-like material comes to the advantage, that it can be efficiently cut to the desired dimensions and formed and joined by traditional processes. The sliding element can be made by an additive manufacturing process.

The first and the two further feedthroughs are designed such that they penetrate the sliding element and thereby the unit. The first feedthrough can be arranged in a centric position of the sliding element. The first and the two further feedthroughs can be through holes in the sliding element.

The first feedthrough can have a cross section, which corresponds to the cross section of the beam in a way that between the beam's surface, along which the sliding element is slidable, and the surface of the first feedthrough a minimum distance is provided, which ensures the slidability of the sliding element, that the sliding element is slidable along the beam in a rotationally fixed manner and that the sliding element is fixable to the beam in a rotationally fixed manner.

The shifting element can have a cross section, which corresponds to the cross section of the two further feedthroughs in a way that between the shifting elements surface, which is shiftable in the two further feedthroughs and the surface of the two further feedthroughs a minimum distance is provided, which ensures the shiftability of the shifting element and that the shifting element is held transversely to the beam while a panel-shaped object is mounted on the object mounting surface. The shifting element can be made of wood, metal or can be polymer based.

A floor stand according to the invention can be used to clamp a panel-shaped object thereto and to put up the panel-shaped object on a floor. Such a floor stand can be used, for example, as follows:

In a first step the foot is connected to the beam followed by putting up the foot on a floor surface such that the beam stands vertically on the floor surface.

In a next step the shifting element is shifted in the two further feedthroughs to a position at which the shifting element provides the object mounting surface, which is needed for placing/mounting the panel-shaped object onto it. The surface, which is needed for placing/mounting the panel-shaped object onto it depends on the depth/thickness of the panel-shaped object. The shifting element is fixed at that position by the fixing device.

In a next step the beam is passed through the first feedthrough of the sliding element which carries the shifting element and slid along the beam down to a position at which the sliding element is fixed to the beam. That position depends on the height of the panel-shaped object. The higher the panel-shaped object is, the closer that position is to the foot.

In a next step the panel-shaped object is placed/mounted onto the object mounting surface and leaned against the beam. Thereby the lower projection can inhibit the slipping away of the panel-shaped object.

In a next step the object contacting surface of the upper clamp, which has been connected with the beam, is contacted to the panel-shaped object by placing the upper clamp on the panel-shaped object, wherein the upper projection can inhibit the slipping away of the panel-shaped object.

In an optional next step, the shifting element is unfixed and by shifting the shifting element towards the beam the lower projection is shifted towards the beam until the lower projection contacts the panel-shaped object and clamps the panel-shaped object to the beam.

The panel-shaped object is now clamped to the floor stand and thereby put up on the floor.

By using such a floor stand in the above described way an exhibitor or owner of artwork can display the artwork without the need of a wall and without having a wall influencing the perception of the artwork. Furthermore, such a floor stand allows for clamping and putting up different panel-shaped objects having different sizes, for example different lengths, heights, thicknesses, frame dimensions etc.

Such a floor stand enables an exhibitor or owner of artwork to put up a panel-shaped object without tools.

Furthermore, such a floor stand enables putting up a panel-shaped object by a single person.

Such a floor stand comprising a lower clamp, an upper clamp, a further lower clamp and a further upper clamp can be used to clamp and put up two panel-shaped objects one on top of the other. To clamp and put up an elongated panel-shaped object, several such floor stands can be used one besides another one. Consequently, such a floor stand can further be used for putting up more than one, for example two or three, panel-shaped objects, on top of each other as well as besides each other.

According to an embodiment of the further aspect of the floor stand the sliding element comprises a surface, which corresponds to the lower projection, so that by shifting the lower projection the panel-shaped object is clampable between the lower projection and the surface, which corresponds to the lower projection.

Thereby a panel-shaped object can be clamped at a horizontal distance to the beam. Because the surface, which corresponds to the lower projection, is part of the lower clamp it is ensured, that irrespective of the size of the panel-shaped object or the vertical position at which the panel-shaped object is clamped, clamping is limited to an edge region.

The surface, which corresponds to the lower projection relates to a surface, which has a similar orientation to the lower projection. The surface, which corresponds to the lower projection can be substantially parallel to the lower projection. The surface which corresponds to the lower projection can be the surface of a plate element, which is arranged on the sliding element in such a way that the surface corresponds to the lower projection. The plate element can be elastically deflectable towards and away from the beam.

Clampable between the lower projection and the surface, which corresponds to the lower projection relates to a state, where the panel-shaped object is clamped between the lower projection and the surface, which corresponds to the lower projection, by the panel-shaped object contacting both the lower projection and the surface, which corresponds to the lower projection.

According to an embodiment of the further aspect of the floor stand, if the beam is passed through the first feedthrough, the surface, which corresponds to the lower projection projects beyond the sliding element in the longitudinal direction of the beam, in particular by one or more centimetres, in particular wherein the surface which corresponds to the lower projection comprises a surface region, which is angled towards the beam.

The surface region, which is angled towards the beam provides a smooth edge, eliminating the risk of scratching a panel-shaped object or injuring a person using the floor stand during clamping and putting up the panel-shaped object.

According to an embodiment of the further aspect of the floor stand the fixing device comprises a locking pin and a through hole in the beam, wherein the locking pin is pushable into the through hole and positionable in the through hole in such a way that, if the locking pin is positioned in the through hole, the sliding element is placeable on the locking pin and is thereby fixable to the beam.

The locking pin can be made of wood, metal or can be polymer based.

According to an embodiment of the further aspect of the floor stand the fixing device comprises a locking pin displaceably held on the sliding element and a through hole in the beam, wherein the locking pin is displaceable into the through hole in such a way that, if the locking pin is displaced into the through hole, it fixes the sliding element to the beam.

According to an embodiment of the further aspect of floor stand the fixing device comprises a fixing screw on the sliding element, wherein the sliding element is braceable against the beam by tightening the fixing screw and is thereby fixable to the beam.

According to an embodiment of the further aspect of the floor stand the fixing device comprises a fixing screw on the sliding element, wherein, if the shifting element is passed through the two further feedthroughs, the shifting element is braceable against the sliding element by tightening the fixing screw and is thereby fixable to the sliding element.

According to an embodiment of the further aspect of the floor stand the first feedthrough and the two further feedthroughs have a substantially rectangular cross section.

According to an embodiment of the further aspect of the floor stand the shifting element is U-shaped, comprises two legs and a web connecting the two legs, wherein one of the two legs extends through one of the two further feedthroughs, the other of the two legs extends through the other of the two further feedthroughs and the web has the lower projection, in particular wherein one of the two legs comprises a pin, which projects beyond the surface of the one of the two legs in such a way that the shifting element is captively connected to the sliding element.

A part of the surface of the two legs can form the object mounting surface.

According to an embodiment of the further aspect of the floor stand the shifting element comprises two guide webs and two connecting webs connecting the two guide webs to form a substantially rectangular frame, one of the two guide webs extending through one of the two further feedthroughs, the other of the two guide webs extending through the other of the two further feedthroughs, one of the two connecting webs connecting the two guide webs on a first side of the sliding element, and the other of the two connecting webs connecting the two guide webs on a second side of the sliding element, which is opposite the first side.

A part of the surface of the two guide webs can form the object mounting surface.

According to an embodiment of the further aspect of the floor stand the upper clamp comprises a further sliding element and a further shifting element, wherein the further shifting element has the object contacting surface and the upper projection.

The further sliding element and the further shifting element are designed according to the sliding element and shifting element of the lower clamp and comprise their features as according to the invention and can also comprise their features as according to any of the embodiments of the lower clamp.

Thereby, the upper part of a panel-shaped object can be clamped to the beam by shifting the upper projection towards the beam and by fixing the upper shifting element.

According to an embodiment of the further aspect of the floor stand the beam comprises a snapping device by which the upper clamp is temporarily holdable in a parking position on the beam.

The snapping device enables the fixing of the upper clamp to the beam at the parking position, while the lower clamp is fixed at a position below the upper clamp. Thereby, a panel-shaped object is placeable onto the object mounting surface of the lower clamp and below the upper clamp. After clamping the panel-shaped object by the lower projection to the beam, the upper clamp can be lowered from the parking position in a controlled manner in order to contact the panel-shaped object to the object contacting surface. This can be done by one person.

According to an embodiment of the further aspect of the floor stand the snapping device is pressed or screwed into the beam, in particular if the foot is connected to the beam, the snapping device is located in an end portion of the beam, which is opposite to the foot.

According to an embodiment of the further aspect of the floor stand the snapping device comprises a ball snapper, wherein the ball of the ball snapper is held by a force of a spring of the ball snapper in a first position, in which the ball protrudes from the surface of the beam in a way that the lower clamp is holdable by the protruding ball, and is pushable from the first position against the force of the spring to a second position in a way that the lower clamp is displaceable over the ball snapper along the beam.

The further aspect also relates to the use of a floor stand according to the further aspect for clamping a panel-shaped object thereto and thereby putting up the panel-shaped object on a floor.

BRIEF DESCRIPTION OF THE DRAWINGS

The floor stand according to the invention is described in more detail below, purely by way of example, on the basis of specific embodiments shown in the figures.

DETAILED DESCRIPTION

Figure 1:
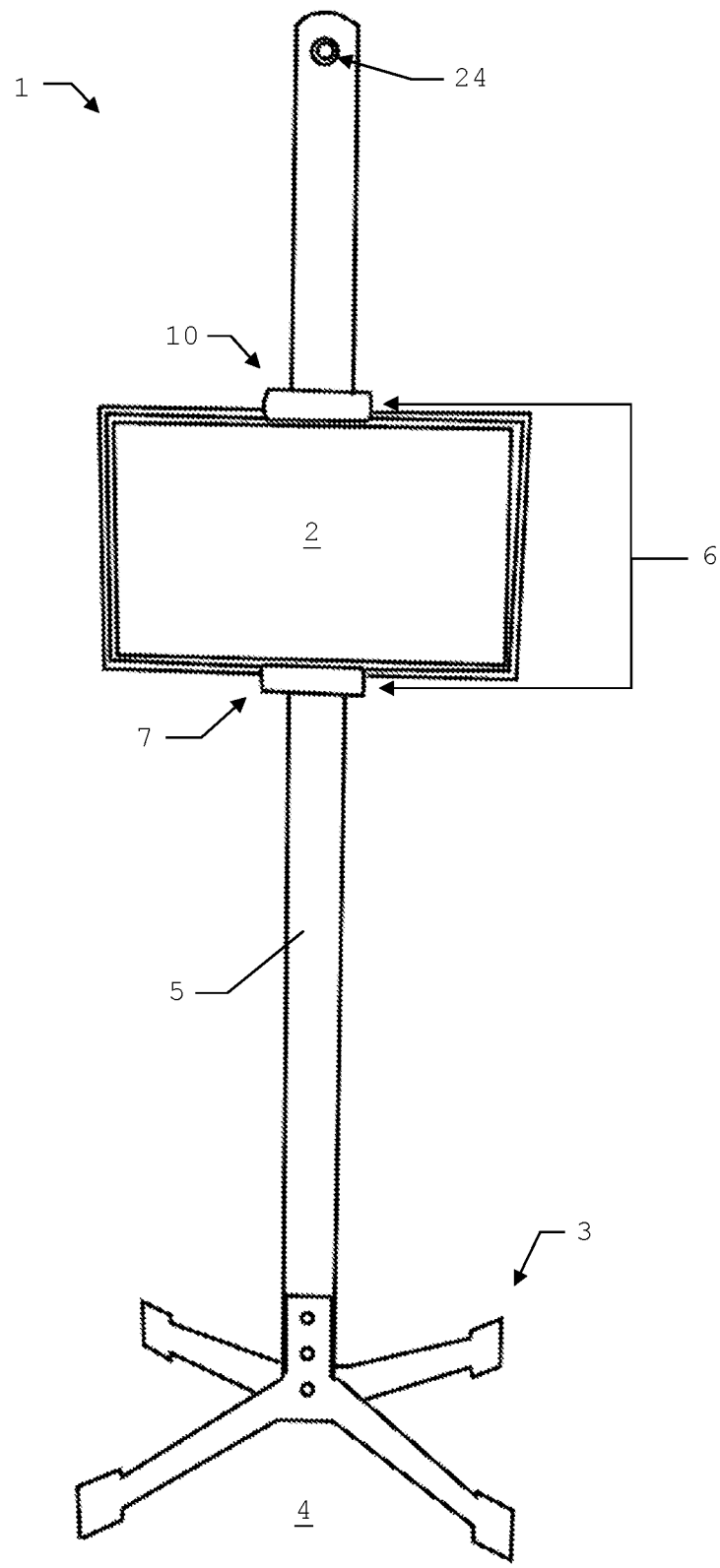
FIG. 1 shows a floor stand with a framed painting clamped to it.
Figure 4:
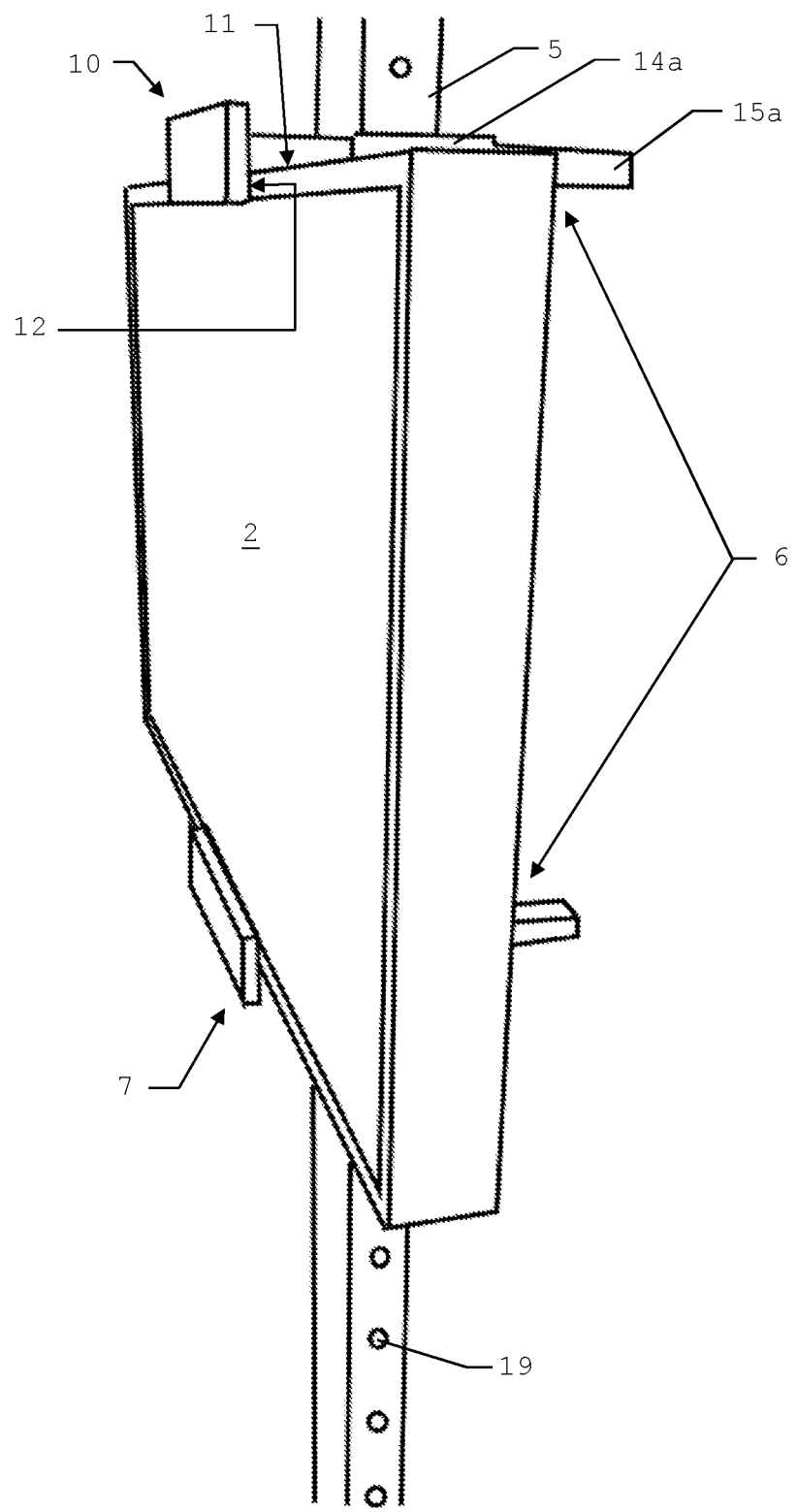
FIG. 4 shows a part of a floor stand having a framed painting clamped to it.
Figure 8:
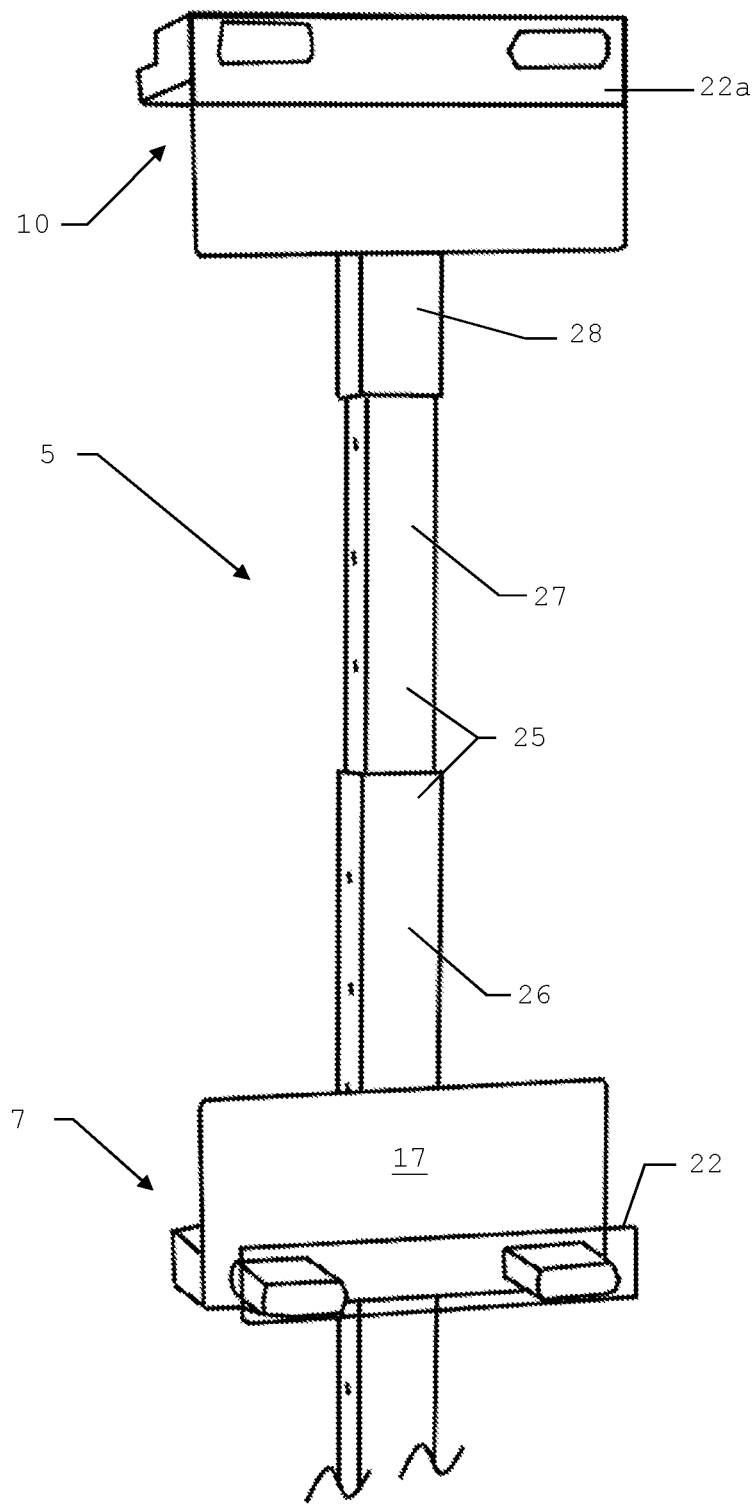
FIG. 8 shows a part of a floor stand having a telescopic beam with a base part and a telescopic part, a lower clamp and a upper clamp with a mounting.

FIG. 1 shows a floor stand 1 with a beam 5 for clamping and putting up a panel-shaped object 2. The beam 5 shown in FIG. 1 can be a telescopic beam 25 as shown in FIG. 8. A foot 3 comprising two separate parts, each having a connecting portion with screw holes, is screwed to the beam 5. The foot 3 comprises four outriggers for stabilizing the floor stand. The floor stand 1 is standing on a floor surface 4. A panel-shaped object 2 in the form of a framed painting is clamped to the beam 5 by the clamping device 6 which comprises a lower clamp 7 and an upper clamp 10. The floor stand 1 of FIG. 1 comprises a snapping device 24 located in an end portion of the beam 5, which is opposite to the foot 3. The upper clamp 10 is temporarily holdable in a parking position by the snapping device 24. The floor stand 1 further comprises a fixing device for fixing the lower clamp to the beam 5. The fixing device comprises a locking pin, several through holes 19 (as shown in FIG. 4) in the beam 5 and a fixing screw 20 (as shown in FIG. 2) at the lower clamp 7.

Figure 2:
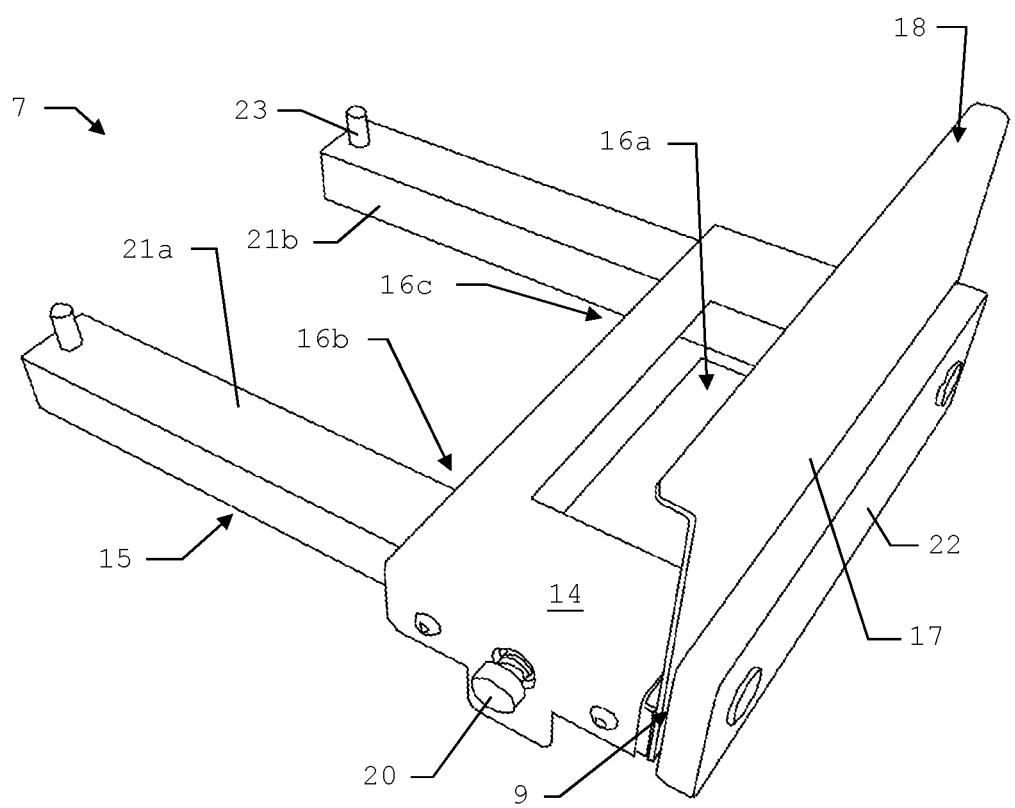
FIG. 2 shows a lower clamp with a sliding element and a shifting element.

The lower clamp 7 of the clamping device 6, shown in FIG. 1, is shown in FIG. 2. The lower clamp 7 comprises a sliding element 14 and a shifting element 15. The sliding element 14 is built from sheet metal and forms a unit. The sliding element 14 comprises a first feedthrough 16*a* and two further feedthroughs 16*b* und 16*c*. The first feedthrough 16*a* is arranged between the two further feedthroughs 16*b* and 16*c*. The beam 5 of floor stand 1, shown in FIG. 1, is passed through the first feedthrough 16*a* and the sliding element 14 is slidable along the beam 5. The sliding element 14 is fixable to the beam 5 by the fixing device. Therefore, the locking pin of the fixing device is pushable into a through hole 19 (as shown in FIG. 4) of the beam 5 and positionable in the through hole 19 in such a way that the sliding element 14 is placeable on the locking pin. Being placed on the locking pin, a movement of the sliding element 14 in a direction towards the foot 3 is blocked.

Figure 3:
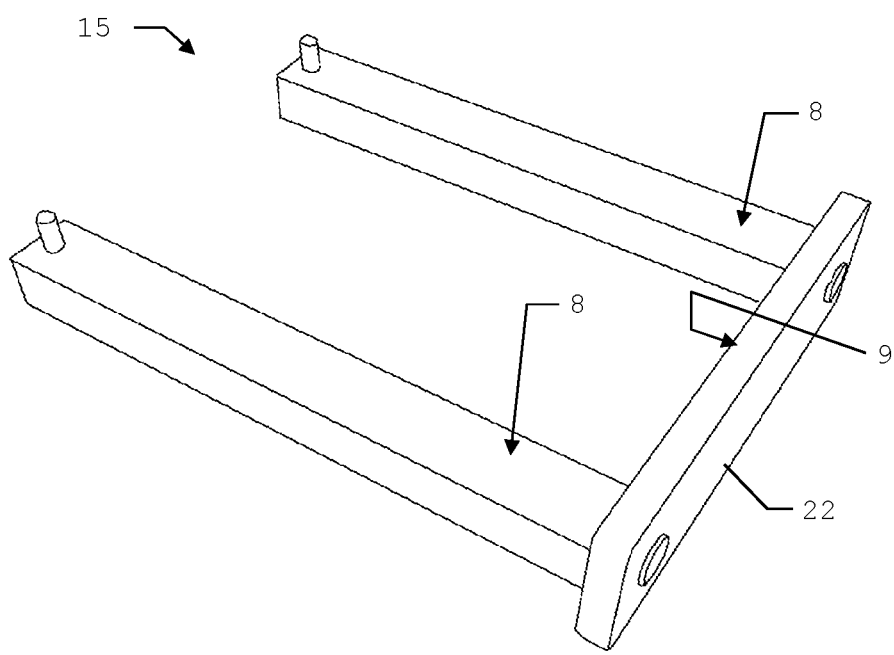
FIG. 3 shows a shifting element.

The shifting element 15 comprises an object mounting surface 8 (as shown in FIG. 3) and a lower projection 9 (as shown in FIG. 3). The object mounting surface 8 is a surface of the shifting element 15 on which the frame of the framed painting, as shown in FIG. 1, is placed. The lower projection 9 is provided by a plate element, which adjoins the object mounting surface 8 in a way that a surface of the plate element is oriented transversely to the object mounting surface 8. That surface of the plate element forms the lower projection 9. The plate element is designed as a cover element, which can be detachably fixed to the shifting element 15. The shifting element further comprises two legs 21*a* and 21*b*, wherein each of the two legs 21*a* and 21*b* comprises a pin 23. Each pin 23 projects beyond the surface of the corresponding leg 21*a* or 21*b* in such a way that the shifting element 15 is captively connected to the sliding element 14. The plate element forms a web 22 connecting the two legs 21*a* and 21*b* such that the shifting element is U-shaped. The shifting element 15 is shiftable in the two further feedthroughs 16*b* and 16*c* and—if the beam 5 is passed through the first feedthrough 16*a*—in a direction transversely to the beam 5. The shifting element 15 is fixable by the fixing device. Therefore, the sliding element 14 comprises the fixing screw 20 by the tightening of which the shifting element 15 is braceable against the sliding element 14.

The sliding element 14 shown in FIG. 2 further comprises a surface 17 which corresponds to the lower projection 9. If the beam 5 is passed through the first feedthrough 16*a*, the surface 17 projects beyond the sliding element 14 in the longitudinal direction of the beam 5. The surface 17 further comprises a surface region 18 which is angled towards the beam 5. The surface 17 is the surface of a plate element, which is arranged on the sliding element 14 in such a way that the surface corresponds to the lower projection 9.

The shifting element 15, shown in FIGS. 1 and 2, is shown in FIG. 3 without the sliding element 14.

FIG. 4 shows a part of a floor stand 1 having a panel-shaped object 2 in the form of a framed painting clamped thereto. The shown part of the floor stand 1 comprises the beam 5, the clamp device 6 with the upper clamp 10 and the lower clamp 7. Furthermore, through holes 19 of the fixing device are shown. The upper clamp 10 comprises an object contacting surface 11 and an upper projection 12 which extends transversely to the object contacting surface 11. The upper clamp 10 comprises a sliding element 14a and a shifting element 15a, wherein the shifting element 15a has the object contacting surface 11 and the upper projection 12—all in analogy to the lower clamp 7 as shown in FIG. 2. The functionality of the upper clamp 10 is analogous to the functionality of the lower clamp 7.

Figure 5:
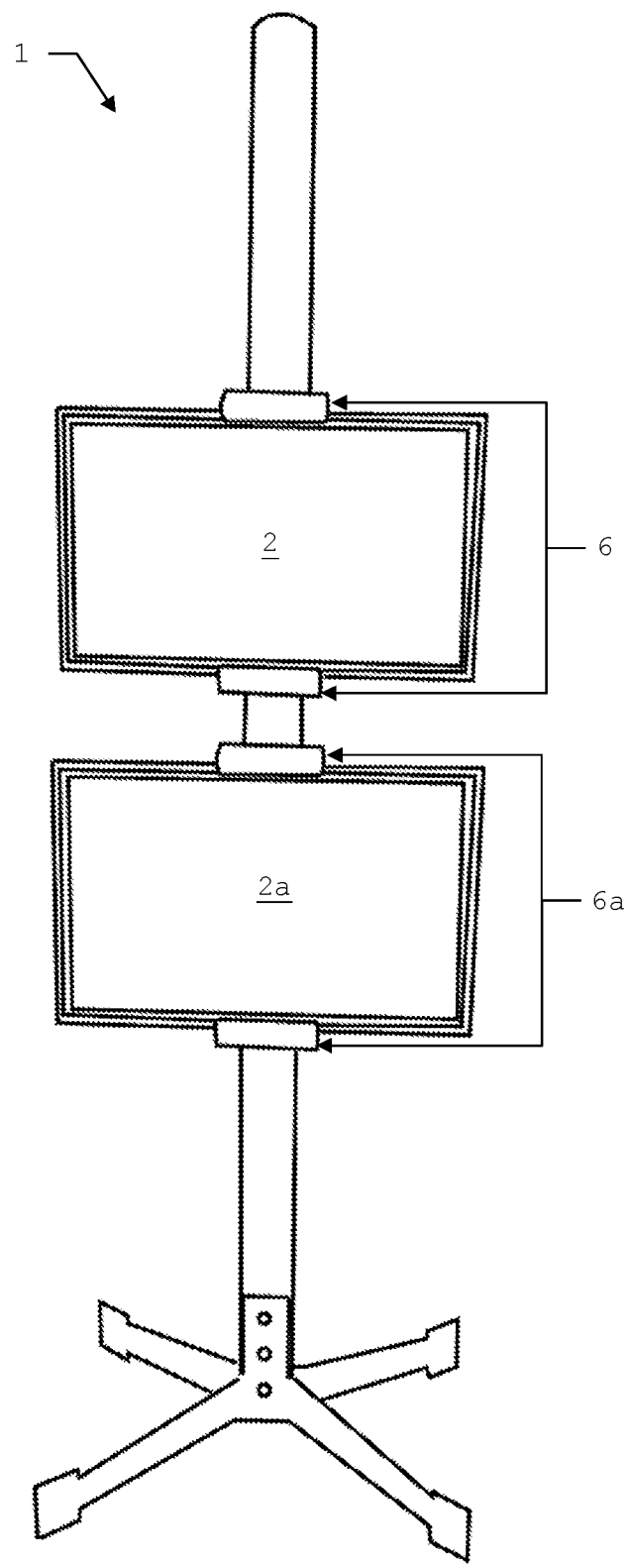
FIG. 5 shows a floor stand having two framed paintings clamped to it.

FIG. 5 shows a floor stand 1 with two clamping devices 6 and 6a. With one clamping device 6 a first panel-shaped object 2 in the form of a framed painting is clamped to the beam 5 of the floor stand. With the other clamping device 6a a further panel-shaped object 2a in the form of a framed painting is clamped to the beam 5 such that the two panel-shaped objects 2 and 2a are clamped to the beam 5 on top of each other.

Figure 6:
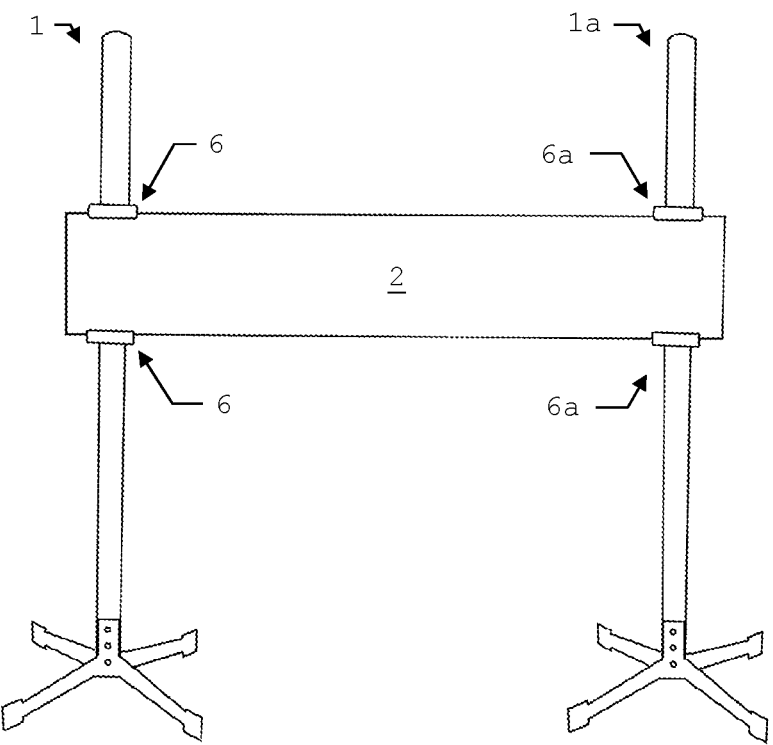
FIG. 6 shows an elongated panel-shaped object clamped to two floor stands.

FIG. 6 shows two floor stands 1 and 1a each having its clamping device 6 and 6a and an elongated panel-shaped object 2. Each end of the elongated panel-shaped object 2 is clamped to one of the two floor stands 1 and 1a. Thereby, an elongated panel-shaped object 2 can be put up on a floor.

Figure 7:
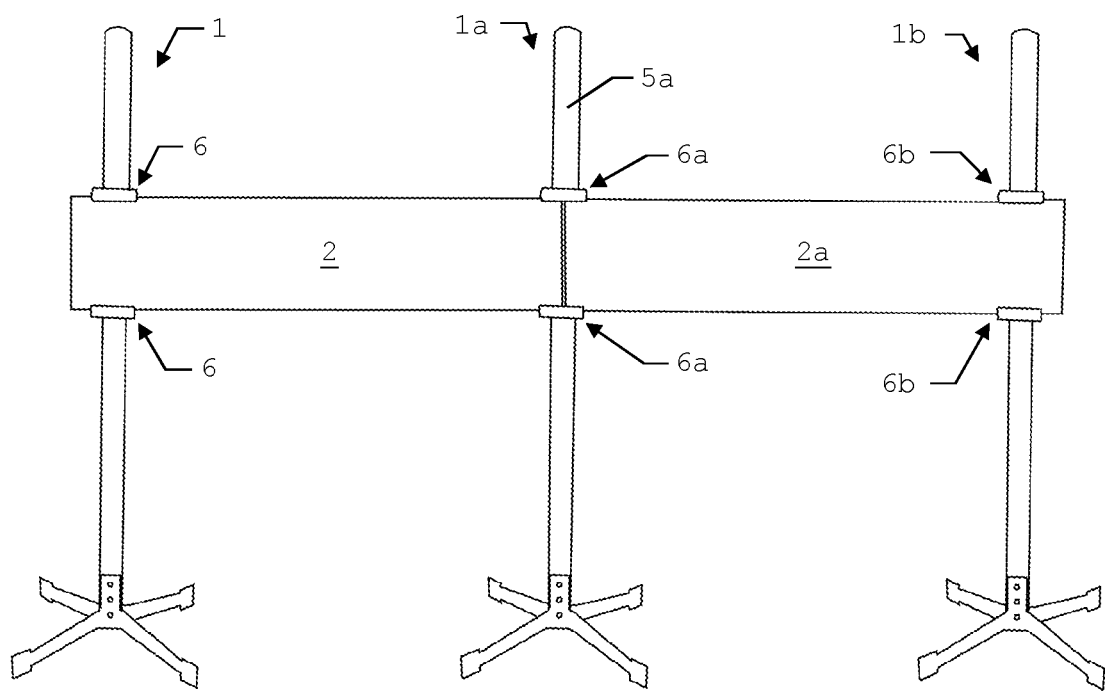
FIG. 7 shows two elongated panel-shaped objects put up aiding three floor stands.

FIG. 7 shows three floor stands 1, 1a and 1b each having its clamping device 6, 6a and 6b and two elongated panel-shaped objects 2 and 2a. Each end of each elongated panel-shaped object 2 and 2a is clamped to one of the three floor stands 1, 1a and 1b, wherein one end of one elongated panel-shaped object 2 and one end of the other panel-shaped object 2a are clamped by the same clamping device 6a to the same beam 5a of the same floor stand 1a. Thereby, two or more elongated panel-shaped object can be put up on a floor.

FIG. 8 shows a part of a floor stand 1 as shown in FIGS. 1, 4, 5, 6, 7 and 10, where the beam 5 is a telescopic beam 25 and includes a base part 26 and a telescopic part 27, wherein the telescopic part 27 is telescopically moveable away from and towards the base part 26 and lockable to the base part 26 in different positions relative to the base part 26 by the fixing device. The upper clamp 10 comprises a mounting 28 which, if the foot is connected to the telescopic beam, is configured to be slipped onto the telescopic part 27 in a direction parallel to the telescopic beam 25 and towards the foot. The upper clamp is slipped onto the telescopic part 27 and fixed by the fixing device to the telescopic part 27. The lower plate element or web 22, and the upper plate element or web 22a are transparent and designed as cover elements, which are detachably fixed to the shifting element 15 of the lower clamp 7 and to the further shifting element 15a of the upper clamp 10 respectively. The floor stand having a telescopic beam can comprise a foot with its features, an upper clamp with its features and a lower clamp with its features as illustrated in the FIGS. 1 to 7.

Figure 9:
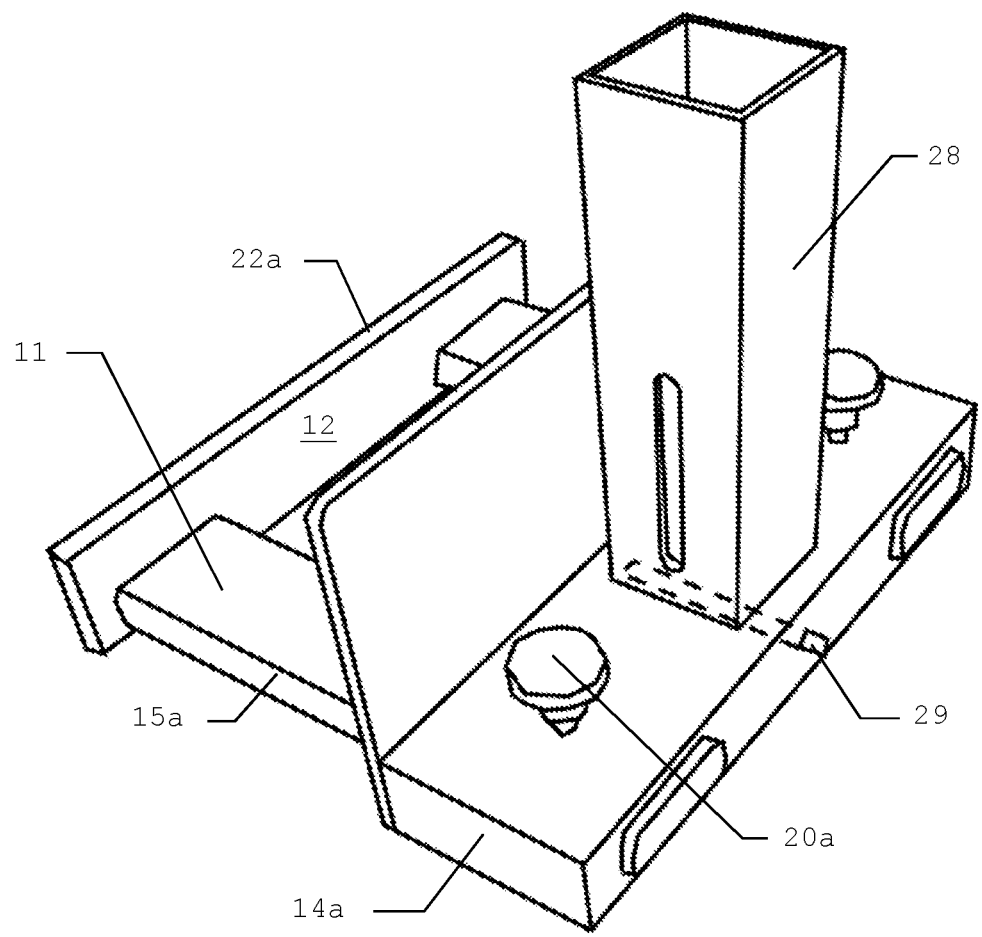
FIG. 9 shows a upper clamp with a mounting.

FIG. 9 shows an upper clamp 10 of a floor stand as shown in FIG. 8. The upper clamp 10 has a tubular profile as mounting 28, an object contacting surface 11, an upper projection 12, a further shifting element 15a and a further sliding element 14a. The upper clamp further has a fixing screw 20a for fixing the further shifting element 15a to the further sliding element 14a at a desired position. The upper clamp further has a bolt as stop 29. The upper plate element or web 22a is transparent and designed as cover element, which is detachably fixed to the further shifting element 15a of the upper clamp 10.

Figure 10:
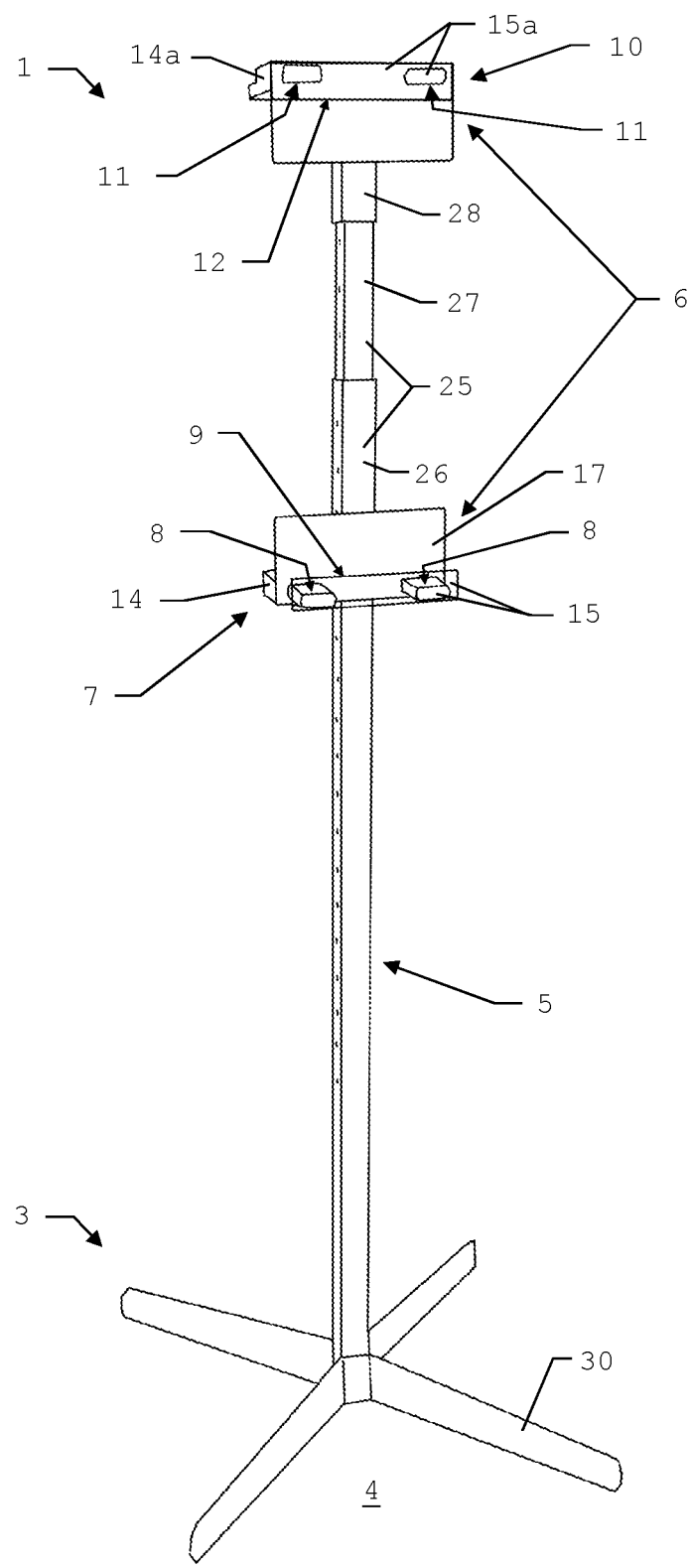
FIG. 10 shows a floor stand standing on a floor surface.

FIG. 10 shows a floor stand 1 for clamping and putting up a panel-shaped object 2. The floor stand 1 has a foot 3 for placing the floor stand 1 on a floor surface 4, a beam 5 which is connectable to the foot 3 and, if connected to the foot 3, can be put up on a floor such that the beam 5 extends in a direction transversely to the floor surface 4, and a clamping device 6.

The clamping device 6 comprises a lower clamp 7 with an object mounting surface 8 and a lower projection 9 transverse to the object mounting surface 8, and an upper clamp 10 with an object contacting surface 11 and an upper projection 12 transverse to the object contacting surface 11, the upper clamp being connectable with the beam 5, wherein the panel-shaped object 2 is mountable onto the object mounting surface 8, contactable with the object contacting surface 11 and clampable to the beam 5 by the clamping device 6, whereby the panel-shaped object 2 can be put up on the floor.

Furthermore, the floor stand 1 has a fixing device for fixing the clamping device 6 to the beam 5.

The foot 3 comprises an outrigger 30 which is configured to stabilize the floor stand 1 such that, with the panel-shaped object 2 clamped to the beam 5 by the clamping device 6, the panel-shaped object 2 is installable free-standing on the floor surface 4, in particular free-standing from a wall and a ceiling.

The beam 5 is a telescopic beam 25 and includes a base part 26 and a telescopic part 27, wherein the telescopic part 27 is telescopically moveable away from and towards the base part 26 and lockable to the base part 26 in different positions relative to the base part 26 by the fixing device.

The upper clamp 10 comprises a mounting 28 which, if the foot 3 is connected to the telescopic beam 25, is configured to be slipped onto the telescopic part 27 in a direction parallel to the telescopic beam 25 and towards the foot 3, and to be fixed by the fixing device to the telescopic part 27.

Furthermore, the lower clamp 7 comprises a sliding element 14 and a shifting element 15. The upper clamp 10 comprises a further sliding element 14a and a further shifting element 15a.

The invention claimed is:

1. A floor stand (1) for clamping and putting up a panel-shaped object (2), the floor stand comprising:
  a foot (3) for placing the floor stand (1) on a floor surface (4),
  a beam (5) which is connectable to the foot (3) and, upon connection to the foot (3), is arrangeable on a floor such that the beam (5) extends in a direction transversely to the floor surface (4), and
  a clamping device (6) comprising
    a lower clamp (7) with an object mounting surface (8) and a lower projection (9) transverse to the object mounting surface (8), and an upper clamp (10) with an object contacting surface (11) and an upper projection (12) transverse to the object contacting surface (11), the upper clamp being connectable with the beam (5), and
  a fixing device for fixing the clamping device (6) to the beam (5),
  wherein the panel-shaped object (2) is
  mountable onto the object mounting surface (8),
  contactable with the object contacting surface (11) and
  clampable to the beam (5) by the clamping device (6),
  such that the panel-shaped object (2) is supported by the floor stand on the floor,
  the foot (3) comprises an outrigger (30) which is configured to stabilize the floor stand such that, with the panel-shaped object (2) clamped to the beam (5) by the clamping device (6), the panel-shaped object (2) is installable on the floor stand free-standing on the floor surface (4),
  the beam (5) is a telescopic beam (25) and includes a base part (26) and a telescopic part (27), wherein the telescopic part (27) is telescopically moveable away from and towards the base part (26) and lockable to the base part (26) in different positions relative to the base part (26) by the fixing device, and the upper clamp (10) comprises a mounting (28) which, with the foot (3) connected to the telescopic beam (25), is configured to be slipped onto the telescopic part (27) in a direction parallel to the telescopic beam (25) and towards the foot (3), and fixed by the fixing device to the telescopic part (27).

2. The floor stand according to claim 1, wherein the upper clamp (10) comprises a stop (29), which is configured to stop the telescopic part (27) from slipping through the mounting (28) and to a position at which the telescopic part protrudes the upper clamp (10).

3. The floor stand according to claim 1, wherein the base part (26) comprises a tubular profile and the telescopic part (27) comprises a tubular profile and the telescopic part (27) has a smaller cross section than the base part (26).

4. The floor stand according to claim 1, wherein the mounting (28) comprises a tubular profile.

5. The floor stand according to claim 1, wherein the mounting (28) has a larger cross section than the telescopic part (27) and is configured to receive the telescopic part inside the cross section.

6. The floor stand according to claim 2, wherein the stop (29) is a bolt arranged on the mounting (28) and, with the mounting is slipped onto the telescopic part, extends transversely to the telescopic beam.

7. The floor stand according to claim 1, wherein the lower clamp (7) includes a sliding element (14) and a shifting element (15), the shifting element (15) comprises the object mounting surface (8) and the lower projection (9), and the sliding element (14) is a unit and comprises a first and two further feedthroughs (16a, 16b, 16c), the first feedthrough (16a) is arranged between the two further feedthroughs (16b, 16c), the beam (5) is passable through the first feedthrough (16a), and upon the beam (5) passing through the first feedthrough (16a), the sliding element (14) is slidable along the beam (5) and fixable thereto by the fixing device, and the shifting element (15) is shiftable in the two further feedthroughs (16b, 16c) in a direction transversely to the beam (5), and is fixable by the fixing device, so that by shifting the lower projection (9) towards the beam (5) and by fixing the shifting element (15), the panel-shaped object (2) is clampable by the lower projection (9) to the beam (5), such that the panel-shaped object (2) is supported on the floor.

8. The floor stand according to claim 7, wherein the sliding element (14) comprises a surface (17) which corresponds to the lower projection (9), so that by shifting the lower projection (9) the panel-shaped object (2) is clampable between the lower projection (9) and the surface (17) which corresponds to the lower projection (9).

9. The floor stand according to claim 8, wherein, upon the beam (5) being passed through the first feedthrough (16a), the surface (17) which corresponds to the lower projection (9) projects beyond the sliding element (14) in a longitudinal direction of the beam (5).

10. The floor stand according to claim 9, wherein the surface (17) which corresponds to the lower projection (9) comprises a surface region (18) which is angled towards the beam (5).

11. The floor stand according to claim 10, wherein the fixing device comprises a locking pin and a through hole (19) in the beam (5) going through the base part and through the telescopic part, the locking pin is pushable into the through hole (19) and positionable in the through hole (19) such that, when the locking pin is positioned in the through hole (19), the sliding element (14) is placeable on the locking pin and is thereby fixable to the beam (5) and the telescopic part is locked to the base part.

12. The floor stand according to claim 11, wherein the fixing device comprises a fixing screw on the sliding element (14), and the sliding element (14) is braceable against the beam (5) by tightening the fixing screw and is thereby fixable to the beam (5).

13. The floor stand according to claim 12, wherein the fixing device comprises a fixing screw (20) on the sliding element (14), wherein, upon the shifting element (15) being passed through the two further feedthroughs (16b, 16c), the shifting element (15) is braceable against the sliding element (14) by tightening the fixing screw (20) and is thereby fixable to the sliding element (14).

14. The floor stand according to claim 12, wherein the first feedthrough (16a) and the two further feedthroughs (16b, 16c) have a substantially rectangular cross section.

15. The floor stand according to claim 12, wherein the shifting element (15) is U-shaped, comprising two legs (21a, 21b) and a web (22) connecting the two legs (21a, 21b), one of the two legs (21a, 21b) extends through one of the two further feedthroughs (16b, 16c), the other of the two legs (21a, 21b) extends through the other of the two further feedthroughs (16b, 16c) and the web (22) has the lower projection (9).

16. The floor stand according to claim 15, wherein one of the two legs (21a, 21b) comprises a pin (23) which projects beyond a surface of the one of the two legs (21a, 21b) such that the shifting element (15) is captively connected to the sliding element (14).

17. The floor stand according to claim 1, wherein the upper clamp (10) comprises a further sliding element (14a) and a further shifting element (15a), and the further shifting element (15a) has the object contacting surface (11) and the upper projection (12).

\* \* \* \* \*